United States Patent [19]

Somers

[11] 3,828,363

[45] Aug. 6, 1974

[54] CASSETTE CONTAINING TWO HUBS CARRYING A MAGNETIC TAPE, FOR USE WITH RECORDING/REPRODUCING APPARATUS

[76] Inventor: Stanley Brice Lascelles Somers, 5 Quai du Mont Blanc, Geneva, Switzerland

[22] Filed: May 9, 1973

[21] Appl. No.: 358,700

[52] U.S. Cl. .................... 360/60, 274/4 C, 360/96

[51] Int. Cl. .................... G11b 15/04, G11b 23/04

[58] Field of Search .............. 179/100.2 D, 100.2 Z; 274/4 C; 242/55.19 A

[56] References Cited

UNITED STATES PATENTS

| | | | |
|---|---|---|---|
| 3,696,217 | 10/1972 | Motoyama et al. | 179/100.2 D |
| 3,702,907 | 11/1972 | Sato | 179/100.2 D |
| 3,718,774 | 2/1973 | Kosaka | 179/100.2 Z |
| 3,721,772 | 3/1973 | Miura et al. | 179/100.2 D |

*Primary Examiner*—Alfred H. Eddleman
*Attorney, Agent, or Firm*—Young & Thompson

[57] ABSTRACT

A cassette, containing magnetic tape carried between two hubs, to be used in a recording/reproducing apparatus, comprising two built in slides each of which is capable of being operated independently from the exterior of the cassette so that it can be placed at will in one or other of two positions which respectively block or unblock hollow spaces provided in the cassette, so that each slide when the cassette is placed in the apparatus either prevents or permits a control lever to enter into the hollow space, the position of this lever controlling the possibility of the erase and record heads being operative and the reproduce head being inoperative, or vice versa.

5 Claims, 11 Drawing Figures

CASSETTE CONTAINING TWO HUBS CARRYING A MAGNETIC TAPE, FOR USE WITH RECORDING/REPRODUCING APPARATUS

Certain apparatus for recording and reproducing, employing cassettes containing magnetic tape, are furnished with a lever commanded by a configuration of the cassette, this lever in one position preventing the magnetic heads from erasing and recording, and in another position permitting the heads to erase and record.

Existing types of cassettes already have various means of ensuring at will that the magnetic heads can carry out these alternative functions, as described below. However, all of these various existing systems have certain drawbacks and the aim of the invention is to provide a cassette which does not have these disadvantages.

According to the invention, a record-enabling-/record-preventing device for a cassette containing a pair of hubs carrying a length of magnetic tape comprises two slides, each of which can be moved independently and from the exterior of the cassette so that each can be slid as required into one or other of two positions, thus respectively blocking or unblocking hollow spaces moulded in the cassette, with the object that each slide, when the cassette is placed in the apparatus, prevents or allows entry into one of the hollow spaces of a lever controlling the magnetic heads in the apparatus, so as to select within the apparatus the correct conditions either for erasing/recording or for reproducing.

The accompanying drawings show three existing types of cassettes and, by way of example, an embodiment of a cassette according to the invention. In the drawings.

The existing type of cassette shown in FIGS. 1 to 4 comprises two similar cassette halves 1 and 2, which together make up a complete cassette. Each cassette half contains in one of its sides two open spaces 3 which form a hollow space when the two cassette havles are assembled together. The cassette half 1 has a safety tab 4 situated in the space formed by the open spaces 3. This tab is moulded with cassette half 1. It prevents a lever in the recoder/player into which the cassette is inserted, from penetrating into the hollow space formed by the open spaces 3, so that this lever is pushed back thus permitting the erase and record heads to be used. If it is necessary to prevent the erase and record heads from being operative, the safety tab 4 (FIG. 4) must be broken out, thus allowing the control lever in the apparatus to penetrate into the hollow space formed by the open spaces 3, which prevents the use of the erase and record heads. The disadvantage of this system is that the broken-out tabs cannot be re-used, and some way must be found to re-block the hole if the appropriate tracks on the tape in the cassette are to be erased and rerecorded.

Figure 1:
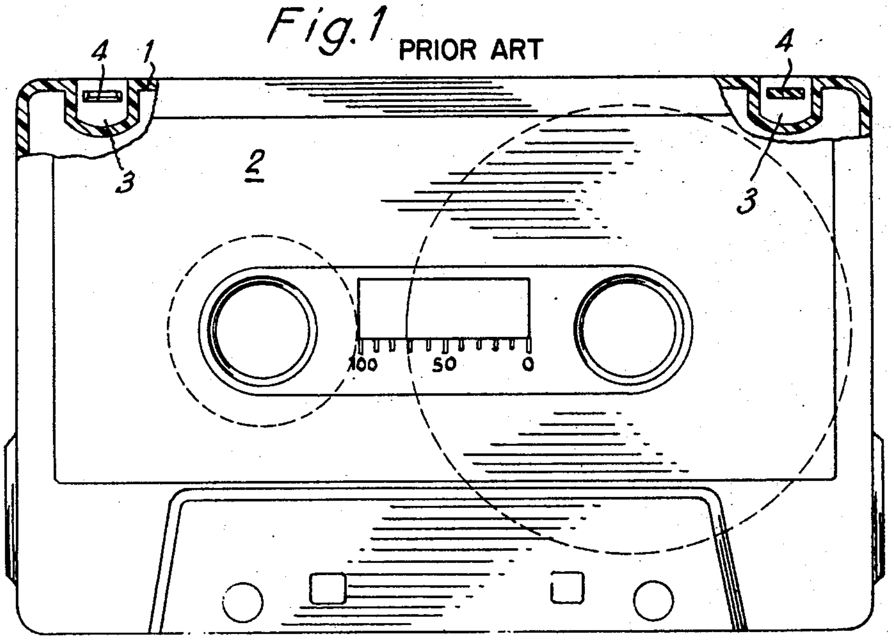
Fig. 1 PRIOR ART
FIG. 1 is a plan view of a first type of existing cassette.
Figures 2, 3, 4, 5, 6:
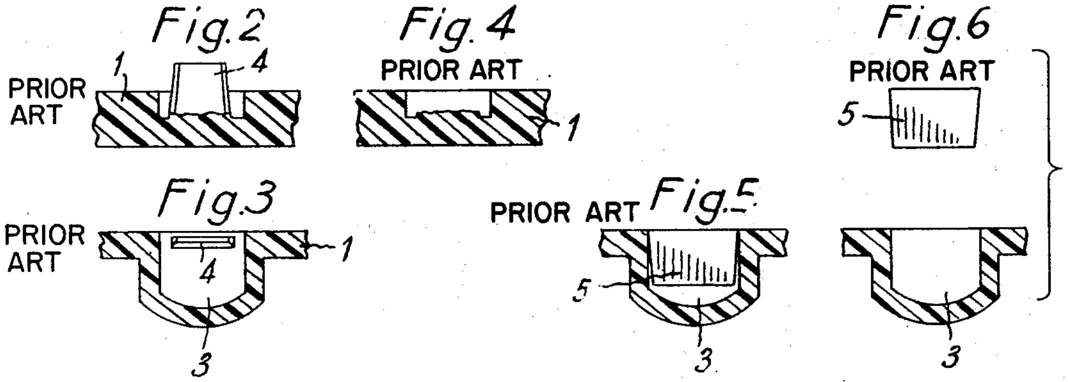
Fig. 2 PRIOR ART, Fig. 3 PRIOR ART, Fig. 4 PRIOR ART, Fig. 5 PRIOR ART, Fig. 6 PRIOR ART
FIGS. 2, 3 and 4 are partial views drawn to a larger scale, corresponding to FIG. 1.
FIGS. 5 and 6 are partial views of a second type of existing cassette.

The second existing type of cassette shown in FIGS. 5 and 6 overcomes this drawback by using, instead of the safety tab 4, an elastic bung 5 which can be inserted into the hollow space created by the open spaces 3 or it can be removed from this space. When the bung 5 is inserted into this space (FIG. 5) it fulfils the same function as the safety tab 4 in the previous cassette and it causes the erase and record heads to be operative. If the bung is removed (FIG. 6) the lever in the apparatus can penetrate into the said space and cause the erase and record heads to be inoperative. It is thus possible to re-use the same cassette for either erase/record or reproduction, as required. It is not easy however to prise out the bung 5 from the hollow space, and when done it is very easy to lose it.

Figure 7:
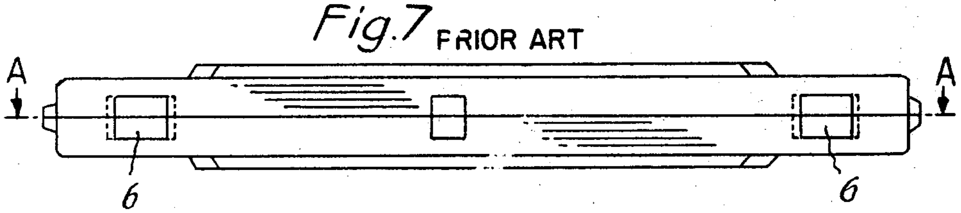
Fig. 7 PRIOR ART
FIG. 7 is a side view of a third type of existing cassette.
Figures 8, 9:
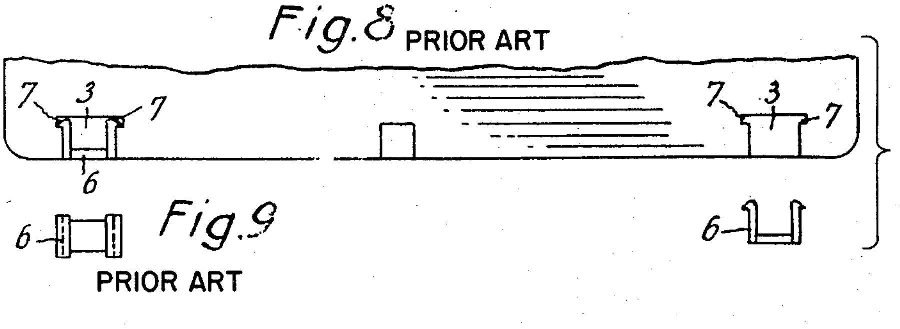
Fig. 8 PRIOR ART, Fig. 9 PRIOR ART
FIG. 8 is a fragmentary cross-sectional view taken on the line A—A of FIG. 7.
FIG. 9 is a plan view of an insert as in FIG. 8.

The third existing type of cassette (FIGS. 7 to 9) employs an insert 6 (shown front view in FIG. 8 and plan view FIG. 9) which can be introduced into the hollow space formed by the open spaces 3, by slightly closing together the two arms of the insert which can then lodge into the channels 7 moulded into the open spaces 3. It is possible with a small special tool to remove the insert 6 from the hollow space. This insert thus fulfils the same functions as the breakable safety tab 4 in the first type of cassette and the removable bung 5 for the second type of cassette. Here again, it is not simple to remove the insert and it can easily be lost.

Figure 10:
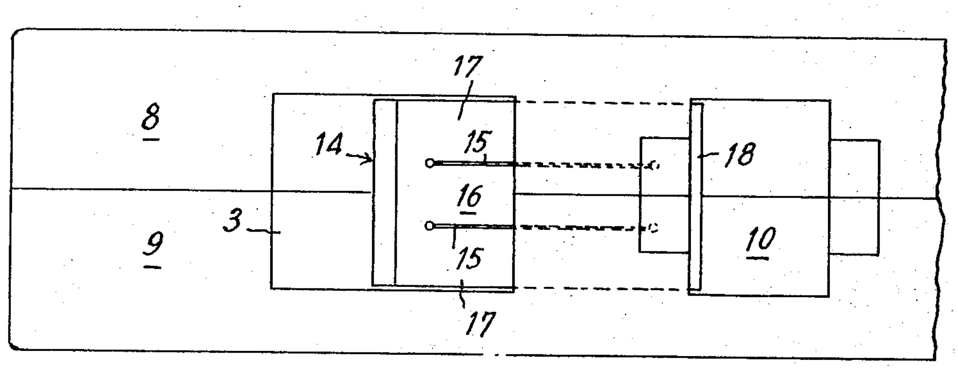
FIG. 10 is an enlarged fragmentary view of the embodiment according to the invention.
Figure 11:
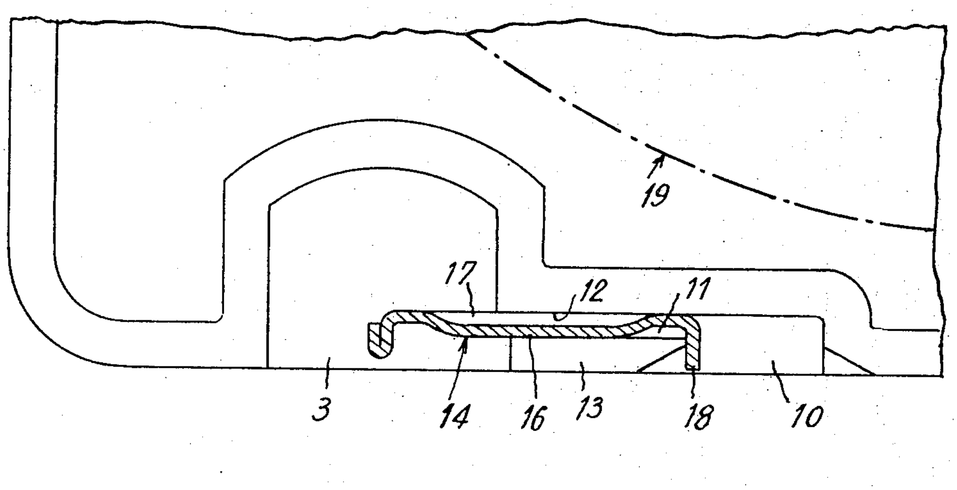
FIG. 11 is a partial sectional view corresponding to FIG. 10.

In the embodiment of the present invention shown in FIGS. 10 and 11, the cassette contains at each end within the sides of the two cassette halves 8 and 9 which make up the cassette, an open space 3 creating a hollow space, this open space 3 being connected to a narrow opening 10 by a slot 11 between a wall 12 and a partition 13 which are moulded integrally with the cassette halves. A safety slide 14, made for example of anodised, coloured aluminum or moulded in coloured polyacetal resin, is placed in each slot 11 in the lower cassette half during the assembly of the two cassette havles 8 and 9. The slide 14 consists of a flat piece with bent ends, having two slits 15. These slits 15 allow the centre part 16 of the slide to project in relation to the remaining lateral surfaces 17, thus forming a spring which prevents the slide from being moved by its own weight, but which permits the slide 14 to be shifted within the slot 11 by pushing with a finger tip against the bent end 18. In the position shown, the safety slide prevents the control lever of the record/playback apparatus from penetrating into the hollow space formed by the open spaces 3 in the cassette halves, thus permitting the erase and record heads to operate. If the slide 14 is shifted towards the centre of the cassette by pushing with a finger tip against the bent end 18, the slide 14 unblocks the hollow space created by the open spaces 3 and the control lever of the apparatus can penetrate into the space, permitting the reproducer head to be operative but preventing the erase and record heads from becoming operative. The relative position of each slide 14 can instantly be identified by the presence or absence of the coloured visible part (red, for example) blocking or unblocking the open space 3.

The arc 19 (FIG. 11) shows the maximum space occupied by a full reel of tape, having a diameter of 52 mm.

The slide 14 can accordingly be shifted at will to one or other of its extreme positions by pushing it from outside the cassette, and because of the friction in the slot 11, there is no risk of the slide being accidentally moved. This slide being an integral part of the cassette, it cannot get lost. It enables a cassette to be used at will for erasing and re-recording or on the contrary to prevent these, the position of each slide being readily visible. These variants can be selected as often as wished. The cassette described is therefore free from the disadvantages of the existing types of cassettes mentioned earlier.

What I claim is:

1. In a cassette containing a mangetic tape carried between two hubs, for use in a recording and reproducing apparatus of the type having erase and record heads and a reproducing head and control levers for selectively permitting operation of the erase and record heads and preventing operation of the reproducing head in one position of said levers and for permitting operation of the reproducing head and preventing operation of the erase and record heads in another position of said levers, said cassette having two hollow spaced therein for receiving said control levers; the improvement comprising a pair of slides carried by said cassette one adjacent to each of said hollow spaces, and means mounting each of said slides on said cassette for sliding movement between a position in which the slide is disposed in and blocks said space for preventing entry of a said control lever, and a retracted position in which said slide unblocks said space for permitting entry of a said lever.

2. A cassette as claimed in claim 1, said mounting means of said slide comprising a slot in said cassette in which

3. A cassette as claimed in claim 1, said slide in the first-mentioned said position extending halfway into said hollow space.

4. A cassette as claimed in claim 1, said slide having longitudinally extending slits that define between them a strip of the material of the slide that projects from the slide into frictional sliding relationship with the cassette.

5. A cassette as claimed in claim 1, said slide having an outwardly extending fingerpiece at its end remote from said space.

* * * * *